Figure 3:
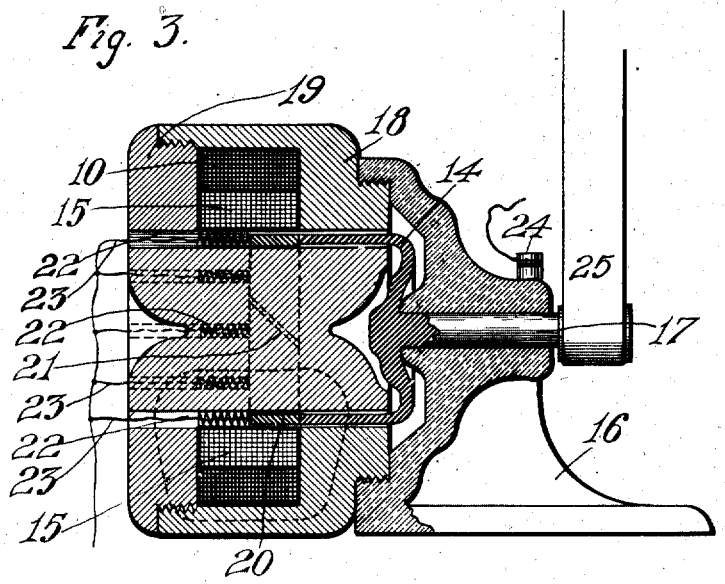

C. G. ASHLEY.
METHOD OF PROPAGATING TELEPHONIC CURRENTS.
APPLICATION FILED JULY 24, 1909.
994,361.
Patented June 6, 1911.
2 SHEETS—SHEET 1.
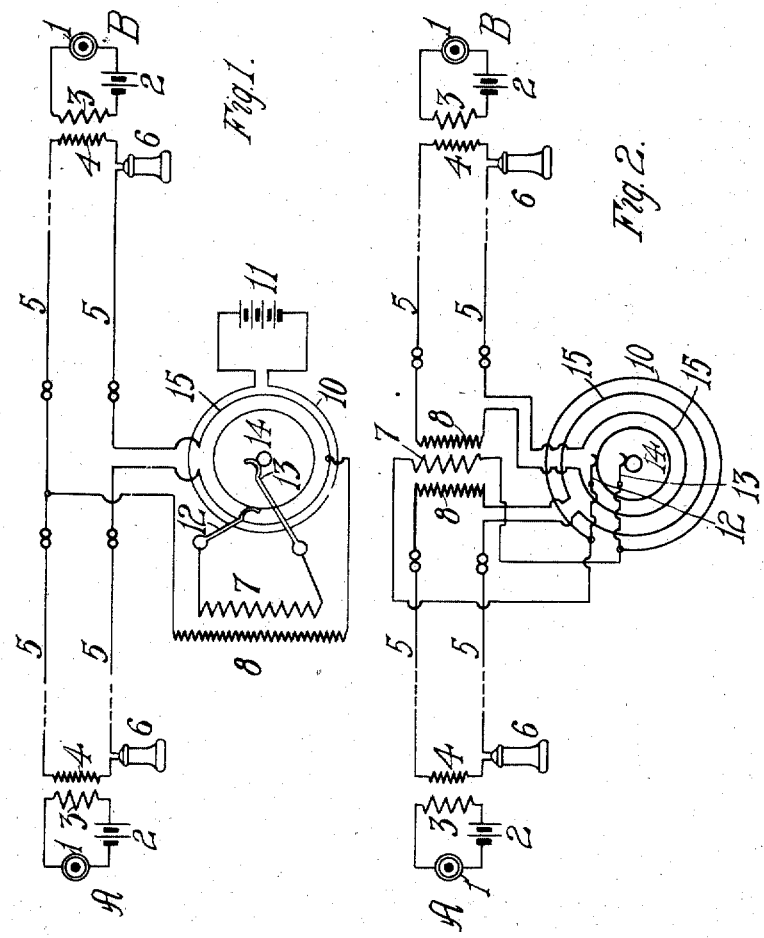
Witnesses:
David S. Hulfish
Wm. Berghahn
Inventor:
Charles G. Ashley
By McMeen Miller
Attys.

C. G. ASHLEY.
METHOD OF PROPAGATING TELEPHONIC CURRENTS.
APPLICATION FILED JULY 24, 1909.

994,361.

Patented June 6, 1911.
2 SHEETS—SHEET 2.

Witnesses:
David S. Hulfish
Wm. Berghahn.

Inventor:
Charles G. Ashley
By McNeen & Niel
Attys.

UNITED STATES PATENT OFFICE.

CHARLES G. ASHLEY, OF CHICAGO, ILLINOIS.

METHOD OF PROPAGATING TELEPHONIC CURRENTS.

994,361.　　　Specification of Letters Patent.　　Patented June 6, 1911.

Application filed July 24, 1909. Serial No. 509,249.

*To all whom it may concern:*

Be it known that I, CHARLES G. ASHLEY, a citizen of the United States of America, and a resident of Chicago, county of Cook, and State of Illinois, have invented a new and useful Improvement in Methods of Propagating Telephonic Currents, of which the following is a specification.

My invention relates to telephony, and has for its object the provision of an improved method of reinforcing telephonic currents, whereby conversation may be satisfactorily held over circuits possessing large capacity, as for example, long distance telephone circuits, to which end I impress current upon an inducing winding from a source independent of the telephonic current and modify this current by the telephonic current, there being an induced winding or member in association with this inducing winding that serves to impress current upon the telephonic circuit, which current corresponds telephonically to the telephonic current originally impressed, but which is of greater value, whereby the receiving telephone instrument is subject to a stronger telephonic current than that it would otherwise be subject to were it not for the employment of this inducing winding with its separate source of supply, the induced winding, and the agency whereby the telephonic current that is to be reinforced effects a modification of the current in the inducing winding.

My improved apparatus is claimed in my application Serial No. 509,250, filed July 24, 1909.

I have been able by means of my invention, to construct an apparatus and a system that will enable the conduct of conversation over a single telephonic circuit in both directions. The instrumentality that I prefer to employ for impressing the inducing winding with the current that is to be modified by the incoming telephonic current, is a well constructed form of the so-called uni-polar dynamo or generator, the terminals of which are connected with the terminals of the inducing winding (of very low resistance) to supply thereto current of comparatively large volume and small pressure, a uni-directional current of ten amperes with a pressure of five-tenths of a volt giving good results. Such current condition is maintained in said inducing winding when the telephone circuit is not in use, the means employed for the purpose of maintaining this current in the inducing winding preferably residing in a local circuit including a battery and an exciting coil producing a field in which the armature of the generator rotates. This field, however, may be furnished by a permanent magnet. By rotating the armature at a uniform velocity through this field, which is of uniform flux density, a current of constant volume and pressure is impressed upon the inducing winding as long as the telephonic circuit is inactive. In order that the current in this inducing winding may be modified, I employ a modifying winding that is subject to the telephonic current initially impressed upon the telephonic circuit and which is adapted to produce in the same field of the uni-polar generator, a supplemental flux that adds to and detracts from the flux density, according to the wave form of the telephonic current. This augmentation and diminution of the flux density causes a corresponding change in the character of the current impressed upon the inducing winding, the voltage and the current both being changed. The induced winding, by reason of its inductive relation to the inducing winding, has impressed thereupon current whose pressure is determined by the ratio of transformation between the induced and the inducing winding, the induced current being stepped up in pressure, whereby outgoing telephonic current is impressed upon the telephonic circuit at the relay of far greater value than it is impressed upon the relay, to enable the proper operation of this receiving telephone or instrument that otherwise would only be subject to extremely weak telephonic current. Thus, a mechanical agency, the power that drives the armature of the uni-polar generator, is employed to step-up the telephonic currents at the relay and, in fact, this mechanical agency may alone be relied upon as the initial agency for this function if the iron of the field is permanently magnetized, or assuming that the armature has been brought to the proper speed, for in this case the field exciting battery or other equivalent source of current (and by "battery" I mean any suitable form of exciting source of current) may be replaced by a shunt connection with the brushes or terminals of the armature, though I prefer to employ the battery or separate field excitation. The induced winding may be a single coil in bridge between the sides of the telephonic circuit, in which case the inducing winding is also a single coil or said induced winding may be subdivided into two coils, one in association with one telephone station and the other in association with the other telephone station or receiving station (for it is obvious that more than one instrumentality for relaying telephonic currents in a telephonic circuit may be employed at intervals along the circuit). Where the induced winding is subdivided into coils, the inducing winding is preferably common thereto. Where the induced winding is in a single coil, it is preferably in bridge of the telephonic circuit, while the modifying winding is desirably in series in the telephonic circuit. In order that the inducing winding will not react upon the modifying winding, the said modifying winding is divided into two equal parts, the induced winding acting differentially upon these parts of the modifying winding and acting thereby differentially upon the inducing circuit.

I will explain my invention more fully by reference to the accompanying drawing, in which—

Figure 4:
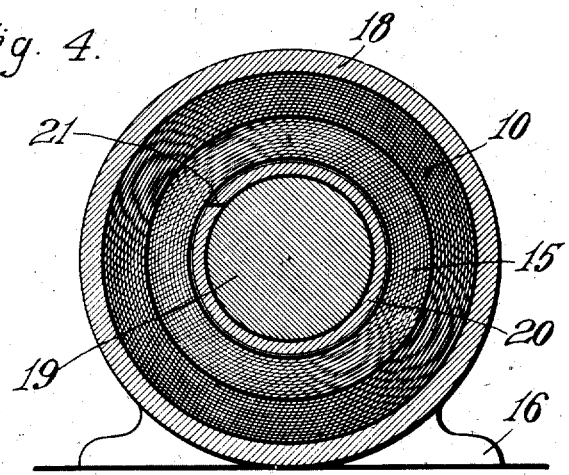

Figure 1 diagrammatically represents one type of telephonic circuit and apparatus equipped in accordance with my invention. Fig. 2 illustrates another type of telephonic circuit and apparatus equipped in accordance with my invention. Fig. 3 is a longitudinal section of a uni-polar generator that is preferably employed in practicing the invention. Fig. 4 is a sectional view on line $a$—$a$ of Fig. 3.

Like parts are indicated by similar characters of reference throughout the different figures.

While I have illustrated but two embodiments of my invention, there may be many embodiments thereof, and I do not, therefore, wish to be limited to the two illustrated.

In each of Figs. 1 and 2 I have illustrated telephone sub-stations, A, B, but have omitted the telephone switch-hooks and other auxiliary apparatus thereat, as an illustration and description of such auxiliary apparatus is not necessary to an understanding of my invention, nor is my invention to be limited to the precise sub-station circuits illustrated. At each sub-station there is shown a telephone transmitter 1 included in a local circuit that contains a battery 2 and a primary 3 of an induction coil in inductive relation with the secondary winding 4 included between the sides 5—5 of the telephonic circuit, a receiver 6 at each station A, B being serially included in a conductor 5. These sides 5 may be conductively continuous or they may be inductively united. In Fig. 1 they are made conductively continuous, as, for example, by a cord circuit properly constructed. In Fig. 2 they are inductively united, though, as a matter of fact, it is not necessary to provide a conductive or an inductive union between the sub-stations of the line, though in the system illustrated in Fig. 2 this is preferred because the inducing winding 7 (hereinafter to be specified) may be common to the coils 8, that are in circuit with the receivers at stations A, B. The element 8 is the induced winding that has impressed thereupon the reinforced telephonic current that is to operate the telephone receiver at the receiving station. This reinforced telephonic current is impressed upon the winding 8 through the agency of the inducing winding 7 that has current normally impressed thereupon of uniform value, by the uni-polar generator, which is diagrammatically shown in Figs. 1 and 2 and whose structure is illustrated in Figs. 3 and 4. The field winding 10 that may be employed to produce the flux which is of uniform density, may be supplied with a constant current from a battery 11, as indicated in Fig. 1, or by being connected between the armature brushes 12—13, as indicated in Fig. 2, it being assumed in the case of the system shown in Fig. 2 that the armature has been brought to the proper speed to maintain the field winding 10, there shown in shunt, sufficiently energized to produce the proper flux. In order that the current conditions in the coil 7 may normally be constant, the armature or inductor 14 from which the generator current is supplied, is rotated at a very high uniform peripheral velocity. The modifying winding 15 is serially related with the telephonic currents initially impressed, this modifying winding being equally divided, so that the induced winding 8 will have differential effect thereupon, so that the said winding 15 is limited to the influence of the telephonic current led thereto from the transmitting station. In the system shown in Fig. 1 the winding 15 is looped in the conductor between the telephone stations. In the system shown in Fig. 2 the winding 15 is also in the circuit extending to the transmitting station, though the circuit between the stations of Fig. 2 is not conductively continuous.

The influence of the coils 10 and 15 and the structural characteristics of the preferred form of uni-polar generator will be more readily understood by reference to Figs. 3 and 4, wherein a base of non-magnetic metal 16 affords a bearing for the shaft 17 of the armature 14 and also a support for the field shell of the generator, that desirably is made up of two sections 18—19 separably connected, the section 18 being desirably separably united with the standard 16 for the purpose of easy assemblage of the parts and access to the windings of the generator. The portion of the frame or standard 16 that directly engages the section 18, is desirably ring-shaped and threaded to engage a correspondingly threaded shoulder upon the section 18. The armature 14 is preferably, though not necessarily, of cup-shape and is desirably made of wrought iron of very high permeability in order to lessen the reluctance of the magnetic circuit, which magnetic circuit includes the sections 18—19 of the field shell, which sections are preferably made of the same material and here constitute a tubular magnet. The reluctance, due to the space between the sections 18—19 in which the armature 14 rotates, is made as small as possible, to which end the air-gaps between the armature and the pole faces of the sections 18—19 are made as small as practicable, whereby the reluctance of the magnetic circuit (indicated by a dot and dash line in Fig. 3) is maintained at a minimum. The shell section 19 is provided with a central projection extending toward the armature, while the shell section 18 is provived with a recess that is closed by said projection to constitute an annular space, in which the field windings 10 and 15 are disposed, the winding 10 being of fewer turns preferably than the winding 15, particularly if this winding 10 is in shunt of the brushes or terminals of the machine. One brush of the machine is desirably in the form of a copper ring 20 that is slotted at 21 to prevent eddy currents, which ring is insulated from, though supported by the central projection or core portion of the element 19. This ring engages the inner peripheral edge of the armature 14, which engagement is desirably maintained by means of light springs 22. The ring 20 is thus stationarily mounted and a series of taps 23 are taken therefrom and are joined together with one conductor extending to one end of the winding 7. The other brush collecting current from the armature 14, is desirably the elongated bearing for the shaft 17, which may be equipped with a binding post 24, so that a conductor may be connected with the other side of the winding 7. The armature may be driven in any suitable way, preferably of a safe limiting velocity, a driving belt 25, running at suitable velocity, being indicated for the purpose. A constant field, and thereby a uniform density of flux through the cylindrical portion of the armature 14, is maintained by the winding 10. This density of flux is increased or diminished through the agency of the fluctuating voice currents passing through the winding 15, whereby the volume and pressure of the current impressed upon the winding 7 is variable whenever the said winding 15 is subject to telephonic current, which current is impressed upon the winding 8 that may be stepped-up sufficiently so that the telephonic current received at the relay I have herein disclosed, may be suitably reinforced. The location of the relay, where one only is employed, is preferably midway between the telephone sub-stations. It will be observed that the circuit of the modifying winding 15 is brought into inductive relation with the circuit of winding 7.

It will be seen that I have provided a method of propagating telephonic currents, which consists in establishing a substantially uniform magnetic field or flux, establishing a current by subjecting an inductor to the action of this field, modifying the current in said inductor by modifying the field to which it is subjected—by the telephonic currents, transforming the current supplied by the inductor to increase its pressure, impressing the transformed current upon the telephonic circuit, and causing the impressed transformed current to act differentially with respect to the magnetic flux to which the inductor is subjected. The field in which the inductor 14 rotates (said inductor is preferably the rotating member of the generator) is a composite field, when the telephonic circuit is in use, one field component being due to the winding 10 and the other field component due to the winding 15.

My method of propagating telephonic currents may also be described as consisting in establishing a current from a source distinct from the telephonic currents, modifying said current by inductively associating telephonic currents with the circuit for said current, transforming the modified current to increase its pressure, impressing the transformed current upon the telephonic circuit, and causing the impressed transformed current to act differentially with respect to the aforesaid current established from said distinct source.

While I employ an exciting winding 10 for magnetizing the sections 18—19 of the generator, I do not wish to be limited to such a way of magnetizing these parts of the generator, as it is obvious that they may be permanently magnetized, in which event the winding 10 will be dispensed with.

It is obvious that many changes may be made in the embodiment of the invention disclosed without departing from the spirit of my invention, and I do not, therefore, wish to be limited to the precise arrangement and apparatus illustrated, but

Having thus described my invention, I claim as new and desire to secure by Letters Patent:—

1. The method of propagating telephonic currents emanating from stations united by a single telephonic circuit, which consists in establishing a substantially uniform magnetic field or flux, establishing a current by subjecting an inductor to the action of this flux, modifying the current in said inductor by modifying the flux to which it is subjected—by the telephonic currents emanating from said stations, transforming and increasing the pressure of the current supplied by the inductor, impressing the transformed current upon the telephonic circuit, and causing the impressed transformed current to act differentially with respect to the magnetic flux to which the inductor is subjected.

2. The method of propagating telephonic currents emanating from stations united by a single telephonic circuit, which consists in establishing a substantially uniform magnetic field or flux, establishing a magnetic field or flux by the telephonic currents emanating from said stations, creating a uni-directional current in a circuit by subjecting an inductor to the uniform magnetic field or flux, modifying the current in the latter circuit by the flux established by the telephonic currents, transforming and increasing the pressure of the modified current, impressing the transformed current upon the telephonic circuit, and causing the impressed transformed current to act differentially with respect to the magnetic flux.

3. The method of propagating telephonic currents emanating from stations united by a single telephonic circuit, which consists in establishing a uniform uni-directional current from a source distinct from the telephonic currents, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the aforesaid current established from said distinct source.

4. The method of propagating telephonic currents emanating from stations united by a single telephonic circuit, which consists in establishing a uni-directional current from a source distinct from the telephonic currents, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the aforesaid current established from said distinct source.

5. The method of propagating telephonic currents emanating from stations united by a single telephonic circuit, which consists in establishing a uniform current from a source distinct from the telephonic currents, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the aforesaid current established from said distinct source.

6. The method of propagating telephonic currents emanating from stations united by a single telephonic circuit, which consists in establishing a current from a source distinct from the telephonic currents, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the aforesaid current established from said distinct source.

7. The method of propagating telephonic currents emanating from stations united by a single telephonic circuit, which consists in establishing a uni-directional current by relative movement between an inductor and a magnetic field or flux, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the uni-directional current.

8. The method of propagating telephonic currents emanating from stations united by a single telephonic circuit, which consists in establishing a uniform current by relative movement between an inductor and a magnetic field or flux, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the uni-directional current.

9. The method of propagating telephonic currents emanating from stations united by a single telephonic circuit, which consists in establishing a current by relative movement between an inductor and a magnetic field or flux, modifying said current by inductively associating telephonic currents emanating from said stations with the circuit for said current, transforming and increasing the pressure of the modified current, impressing the tranformed current upon the telephonic circuit, and causing the impressed transformed current to act differentially with respect to the uni-directional current.

10. The method of propagating telephonic currents emanating from stations united by a single telephonic circuit, which consists in establishing a uni-directional current by relative movement between an inductor and a uniform magnetic field or flux, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the uni-directional current.

11. The method of propagating telephonic currents emanating from stations united by a single telephonic circuit, which consists in establishing a uniform current by relative movement between an inductor and a uniform magnetic field or flux, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the uni-directional current.

12. The method of propagating telephonic currents emanating from stations united by a single telephonic circuit, which consists in establishing a current by relative movement between an inductor and a uniform magnetic field or flux, modifying said current by inductively associating telephonic currents emanating from said stations with the circuit for said current, transforming and increasing the pressure of the modified current, impressing the transformed current upon the telephonic circuit, and causing the impressed transformed current to act differentially with respect to the uni-directional current.

13. The method of propagating telephonic currents emanating from stations united by a single telephonic circuit, which consists in establishing a substantially uniform magnetic field or flux, establishing a magnetic field or flux by the telephonic currents emanating from said stations, creating a current in a circuit by subjecting an inductor to the uniform magnetic field or flux, modifying the current in the latter circuit by the flux established by the telephonic currents, transforming and increasing the pressure of the modified current, impressing the transformed current upon the telephonic circuit, and causing the impressed transformed current to act differentially with respect to the magnetic flux.

14. The method of propagating telephonic currents emanating from stations united by a single telephonic circuit, which consists in establishing a magnetic field or flux, establishing a current by subjecting an inductor to the action of this flux, modifying the current in said inductor by modifying the flux to which it is subjected—by the telephonic currents emanating from said stations, transforming and increasing the pressure of the current supplied by the inductor, impressing the transformed current upon the telephonic circuit, and causing the impressed transformed current to act differentially with respect to the magnetic flux to which the inductor is subjected.

15. The method of propagating telephonic currents emanating from stations united by a single telephonic circuit, which consists in establishing a magnetic field or flux, establishing a magnetic field or flux by the telephonic currents, creating a uni-directional current in a circuit by subjecting an inductor to the magnetic field or flux, modifying the current in the latter circuit by the flux established by the telephonic currents emanating from said stations, transforming and increasing the pressure of the modified current, impressing the transformed current upon the telephonic circuit, and causing the impressed transformed current to act differentially with respect to the magnetic flux.

16. The method of propagating telephonic currents emanating from stations united by a single telephonic circuit, which consists in establishing a magnetic field or flux, establishing a magnetic field or flux by the telephonic currents, creating a current in a circuit by subjecting an inductor to the magnetic field or flux, modifying the current in the latter circuit by the flux established by the telephonic currents emanating from said stations, transforming and increasing the pressure of the modified current, impressing the transformed current upon the telephonic circuit, and causing the impressed transformed current to act differentially with respect to the magnetic flux.

17. The method of propagating telephonic currents emanating from stations united by a single telephonic circuit, which consists in establishing a magnetic field or flux, establishing a current by subjecting an inductor to the action of this flux, modifying the current in said inductor by modifying the flux to which it is subjected—by the telephonic currents emanating from said stations, transforming and increasing the pressure of the current supplied by the inductor, impressing the transformed current upon the telephonic circuit, and causing the impressed transformed current to act differentially with respect to the magnetic flux to which the inductor is subjected.

18. The method of propagating telephonic currents emanating from stations united by a single telephonic circuit, which consists in establishing a magnetic field or flux, establishing a magnetic field or flux by the telephonic currents, creating a current in a circuit by subjecting an inductor to the magnetic field or flux, modifying the current in the latter circuit by the flux established by the telephonic currents emanating from said stations, transforming and increasing the pressure of the modified current, impressing the transformed current upon the telephonic circuit, and causing the impressed transformed current to act differentially with respect to the magnetic flux to which the inductor is subjected.

19. The method of propagating telephonic currents emanating from stations united by a single telephonic circuit, which consists in establishing a substantially uniform magnetic field or flux, establishing a current by subjecting an inductor to the action of this flux, modifying the current in said inductor by modifying the flux to which it is subjected—by the telephonic currents passing from either station to the other over said single telephonic circuit, transforming and increasing the pressure of the current supplied by the inductor, and impressing the transformed current upon the telephonic circuit.

20. The method of propagating telephonic currents emanating from stations united by a single telephonic circuit, which consists in establishing a substantially uniform magnetic field or flux, establishing a magnetic field or flux by the telephonic currents passing from either station to the other over said single telephonic circuit, creating a uni-directional current in a circuit by subjecting an inductor to the uniform magnetic field or flux, modifying the current in the latter circuit by the flux established by the telephonic currents emanating from said stations, transforming and increasing the pressure of the modified current, and impressing the transformed current upon the telephonic circuit.

21. The method of propagating telephonic currents emanating from stations united by a single telephonic circuit, which consists in establishing a uniform uni-directional current from a source distinct from the telephonic currents passing from either station to the other over said single telephonic circuit, modifying said current by inductively associating telephonic currents emanating from said stations with the circuit for said current, transforming and increasing the pressure of the modified current, and impressing the transformed current upon the telephonic circuit.

22. The method of propagating telephonic currents emanating from stations united by a single telephonic circuit, which consists in establishing a uni-directional current from a source distinct from the telephonic currents passing from either station to the other over said single telephonic circuit, modifying said current by inductively associating telephonic currents emanating from said stations with the circuit for said current, transforming and increasing the pressure of the modified current, and impressing the transformed current upon the telephonic circuit.

23. The method of propagating telephonic currents emanating from stations united by a single telephonic circuit, which consists in establishing a uniform current from a source distinct from the telephonic currents passing from either station to the other over said single telephonic circuit, modifying said current by inductively associating telephonic currents emanating from said stations with the circuit for said current, transforming and increasing the pressure of the modified current, and impressing the transformed current upon the telephonic circuit.

24. The method of propagating telephonic currents emanating from stations united by a single telephonic circuit, which consists in establishing a current from a source distinct from the telephonic currents passing from either station to the other over said single telephonic circuit, modifying said current by inductively associating telephonic currents emanating from said stations with the circuit for said current, transforming and increasing the pressure of the modified current, and impressing the transformed current upon the telephonic circuit.

25. The method of propagating telephonic currents emanating from stations united by a single telephonic circuit, which consists in establishing a uni-directional current by relative movement between an inductor and a magnetic field or flux, modifying said current by inductively associating telephone currents passing from either station to the other over said single telephonic circuit with the circuit for said current, transforming and increasing the pressure of the modified current, and impressing the transformed current upon the telephonic circuit.

26. The method of propagating telephonic currents emanating from stations united by a single telephonic circuit, which consists in establishing a uniform current by relative movement between an inductor and a magnetic field or flux, modifying said current by inductively associating telephonic currents passing from either station to the other over said single telephonic circuit with the circuit for said current, transforming and increasing the pressure of the modified current, and impressing the transformed current upon the telephonic circuit.

27. The method of propagating telephonic currents emanating from stations united by a single telephonic circuit, which consists in establishing a current by relative movement between an inductor and a magnetic field or flux, modifying said current by inductively associating telephonic currents passing from either station to the other over said single telephonic circuit with the circuit for said current, transforming and increasing the pressure of the modified current, and impressing the transformed current upon the telephonic circuit.

28. The method of propagating telephonic currents emanating from stations united by a single telephonic circuit, which consists in establishing a uni-directional current by relative movement between an inductor and a uniform magnetic field or flux, modifying said current by inductively associating telephonic currents passing from either station to the other over said single telephonic circuit with the circuit for said current, transforming and increasing the pressure of the modified current, and impressing the transformed current upon the telephonic circuit.

29. The method of propagating telephonic currents emanating from stations united by a single telephonic circuit, which consists in establishing a uniform current by relative movement between an inductor and a uniform magnetic field or flux, modifying said current by inductively associating telephonic currents passing from either station to the other over said single telephonic circuit with the circuit for said current, transforming and increasing the pressure of the modified current, and impressing the transformed current upon the telephonic circuit.

30. The method of propagating telephonic currents emanating from stations united by a single telephonic circuit, which consists in establishing a current by relative movement between an inductor and a uniform magnetic field or flux, modifying said current by inductively associating telephonic currents passing from either station to the other over said single telephonic circuit with the circuit for said current, transforming and increasing the pressure of the modified current, and impressing the transformed current upon the telephonic circuit.

31. The method of propagating telephonic currents emanating from stations united by a single telephonic circuit, which consists in providing a magnetic field or flux, modifying said magnetic field or flux by the telephonic currents passing from either station to the other over said single telephonic circuit, providing a rotating inductor in said flux, transforming and increasing the pressure of the current caused to flow in the inductor, and impressing the transformed current upon the telephonic line.

32. The method of propagating telephonic currents emanating from stations united by a single telephonic circuit, which consists in providing a uniform magnetic field or flux, modifying said magnetic field or flux by the telephonic currents passing from either station to the other over said single telephonic circuit, providing a rotating inductor in said flux, transforming and increasing the pressure of the current caused to flow in the inductor, and impressing the transformed current upon the telephone line.

33. The method of propagating telephonic currents emanating from stations united by a single telephonic circuit, which consists in establishing a magnetic field or flux, establishing a current by subjecting a rotating inductor to the action of this flux, modifying the current in said inductor by modifying the flux to which it is subjected— by the telephonic currents passing from either station to the other over said single telephonic circuit, transforming and increasing the pressure of the current supplied by the inductor, and impressing the transformed current upon the telephonic circuit.

34. The method of propagating telephonic currents emanating from stations united by a single telephonic circuit, which consists in establishing a magnetic field or flux, establishing a magnetic field or flux by the telephonic currents passing from either station to the other over said single telephonic circuit, creating a current in a circuit by subjecting a rotating inductor to the first mentioned magnetic field or flux, modfyng the current in the latter circuit by the flux established by the telephonic currents emanating from said stations, transforming and increasing the pressure of the modified current, and impressing the transformed current upon the telephonic circuit.

35. The method of propagating telephonic currents emanating from stations united by a single telephonic circuit, which consists in establishing a substantially uniform magnetic field or flux, establishing a magnetic field or flux by the telephonic currents passing from either station to the other over said single telephonic circuit, creating a current in a circuit by subjecting a rotating inductor to the first mentioned uniform magnetic field or flux, modifying the current in the latter circuit by the flux established by the telephonic currents emanating from said stations, transforming and increasing the pressure of the modified current, and impressing the transformed current upon the telephonic circuit.

36. The method of propagating telephonic currents emanating from stations united by a single telephonic circuit, which consists in establishing a magnetic field or flux, establishing a current by subjecting a rotating inductor to the action of this flux, modifying the current in said inductor by modifying the flux to which it is subjected—by the telephonic currents passing from either station to the other over said single telephonic circuit, transforming and increasing the pressure of the current supplied by the inductor, and impressing the transformed current upon the telephonic circuit.

37. The method of propagating telephonic currents emanating from stations united by a single telephonic circuit, which consists in establishing a magnetic field or flux, establishing a magnetic field or flux by the telephonic currents passing from either station to the other over said single telephonic circuit, creating a uni-directional current in a circuit by subjecting a rotating inductor to the first mentioned magnetic field or flux, modifying the current in the latter circuit by the flux established by the telephonic currents emanating from said stations, transforming and increasing the pressure of the modified current, and impressing the transformed current upon the telephonic circuit.

38. The method of propagating telephonic currents emanating from stations united by a single telephonic circuit, which consists in establishing a magnetic field or flux, establishing a magnetic field or flux by the telephonic currents passing from either station to the other over said single telephonic circuit creating a current in a circuit by subjecting a rotating inductor to the first mentioned magnetic field or flux, modifying the current in the latter circuit by the flux established by the telephonic currents emanating from said stations, transforming and increasing the pressure of the modified current, and impressing the transformed current upon the telephonic circuit.

39. The method of propagating telephonic currents emanating from either station of a single telephone line, which consists in amplifying the current wave by inductively associating the telephonic currents from either station of said single line telephone, with a current induced by motion of an inductor in a uniform magnetic field, maintained by an outside source of energy; in increasing the voltage by transformer action and impressing the amplified and transformed current upon the telephone circuit.

40. The method of propagating telephonic currents emanating from either station of a single telephone line, which consists in creating a uniform magnetic field or flux by an outside source of energy, modifying said field or flux by inductive influence of telephonic currents emanating from either station of said telephone line, inducing a current, corresponding to the thus modified field or flux, by means of an inductor moving in said field or flux, transforming induced current to increase pressure, and impressing the thus amplified and transformed current upon the telephone line.

41. The method of propagating telephonic currents emanating from either station of a single telephone line, which consists in creating a magnetic field or flux of constant value, bringing into inductive influence with this field or flux a magnetic field or flux of varying value, produced by telephonic currents from either station of said telephone line, thus producing a varying field or flux which produces an amplified current in a moving inductor, transforming said amplified current to increased pressure and impressing resultant current upon the telephone circuit.

Signed by me at Chicago, county of Cook and State of Illinois this fifteenth day of July, 1909.

CHARLES G. ASHLEY.

Witnesses:
 DAVID S. HULFISH,
 HARRIET L. SMITH.